Aug. 28, 1923.

W. SEGMAN

BRACELET

Filed Aug. 29, 1922

1,466,566

WITNESSES

William P. Goebel.

INVENTOR
William Segman
BY
ATTORNEYS

Patented Aug. 28, 1923.

1,466,566

UNITED STATES PATENT OFFICE.

WILLIAM SEGMAN, OF NEW YORK, N. Y.

BRACELET.

Application filed August 29, 1922. Serial No. 585,069.

*To all whom it may concern:*

Be it known that I, WILLIAM SEGMAN, a citizen of the United States of America, and a resident of the city of New York, borough of the Bronx, in the county of Bronx and State of New York, have invented a new and Improved Bracelet, of which the following is a description.

My invention relates to bracelets and more particularly to a chain bracelet and the invention has for its general object to provide a chain bracelet improved in various particulars to embody strength combined with attractive appearance and embodying links of simple form well adapted for receiving stones in a desirable arrangement.

Reference is to be had to the accompanying drawings forming a part of this specification, it being understood that the drawings are merely illustrative of one example of the invention.

Figure 1:
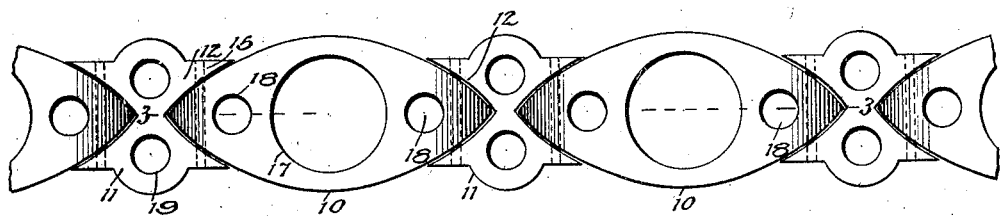
Figure 1 is a plan view of a section of a bracelet embodying my invention.
Figure 2:
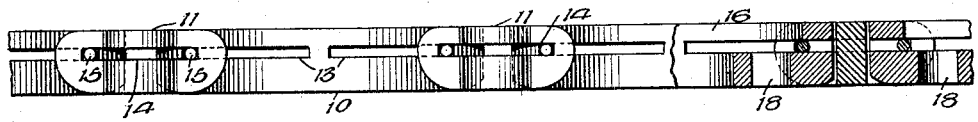
Figure 2 is a side elevation of the same.
Figure 3:
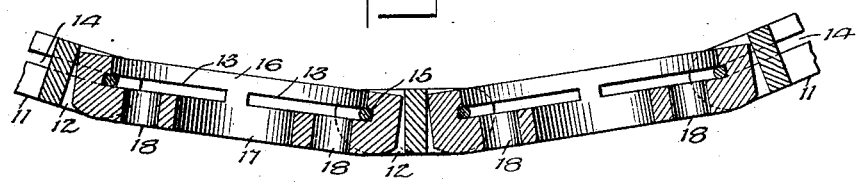
Figure 3 is a longitudinal section on the line 3—3 Figure 1.
Figure 4:
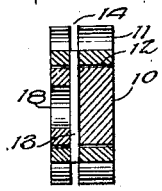
Figure 4 represents a cross section.

In carrying out my invention in accordance with the illustrated example I provide links 10 which in the preferred form of the invention are elliptical, said links alternating with shorter links 11 having at the opposite ends thereof tapered or V-shaped recesses 12 to accommodate the tapered ends of the links 10.

The links 10 are formed with slots 13 parallel with the inner and outer faces of said links and extending from points near the transverse center of the link to points adjacent the ends of the link. Similarly, the intermediate links 11 have longitudinal slots 14 parallel with the inner and outer faces. The slots 13 of a link 10 overlap the slots 14 in the links 11 and connection is completed by transverse pins 15 passed through the respective slots, the pins serving to hold the tapered ends of the links 10 in the recesses 12 of the links 11.

It will be observed that the slots 13 and 14 are slightly nearer one face of the chain than the opposite face to give the chain a more pronounced flexibility in one direction than the other.

The elliptical links 10 are recessed for almost their complete area as at 16 at the inner side of the link and central of and registering with the recessed portion 16 is a hole 17 for the setting of a large stone and positioning of the same centrally of the link and in practice also the links 10 at the outer surface thereof are formed with holes 18 between the central holes 17 and the ends of the link to receive smaller stones. In the links 11 a hole 19 is formed at each side of the medial line of the link for receiving two alining stones in a plane transverse to the stones in the link 10.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A bracelet composed of elliptical links and intermediate shorter links, the latter links having end recesses conforming to the tapered ends of the first-mentioned links together with pins passing transversely through the tapered ends of the first-mentioned links and through the intermediate links at the recesses thereof.

2. A bracelet composed of elongated links and intermediate shorter links, both of said links having slots parallel with the inner and outer faces of the links, the intermediate links having recesses snugly accommodating the ends of the first-mentioned links, and transverse pins passing through said slots and serving to connect the links.

WILLIAM SEGMAN.